July 2, 1940.  A. J. METZ  2,206,101
FRONT END ASSEMBLY FOR MOTOR VEHICLES
Filed May 3, 1937  5 Sheets-Sheet 1
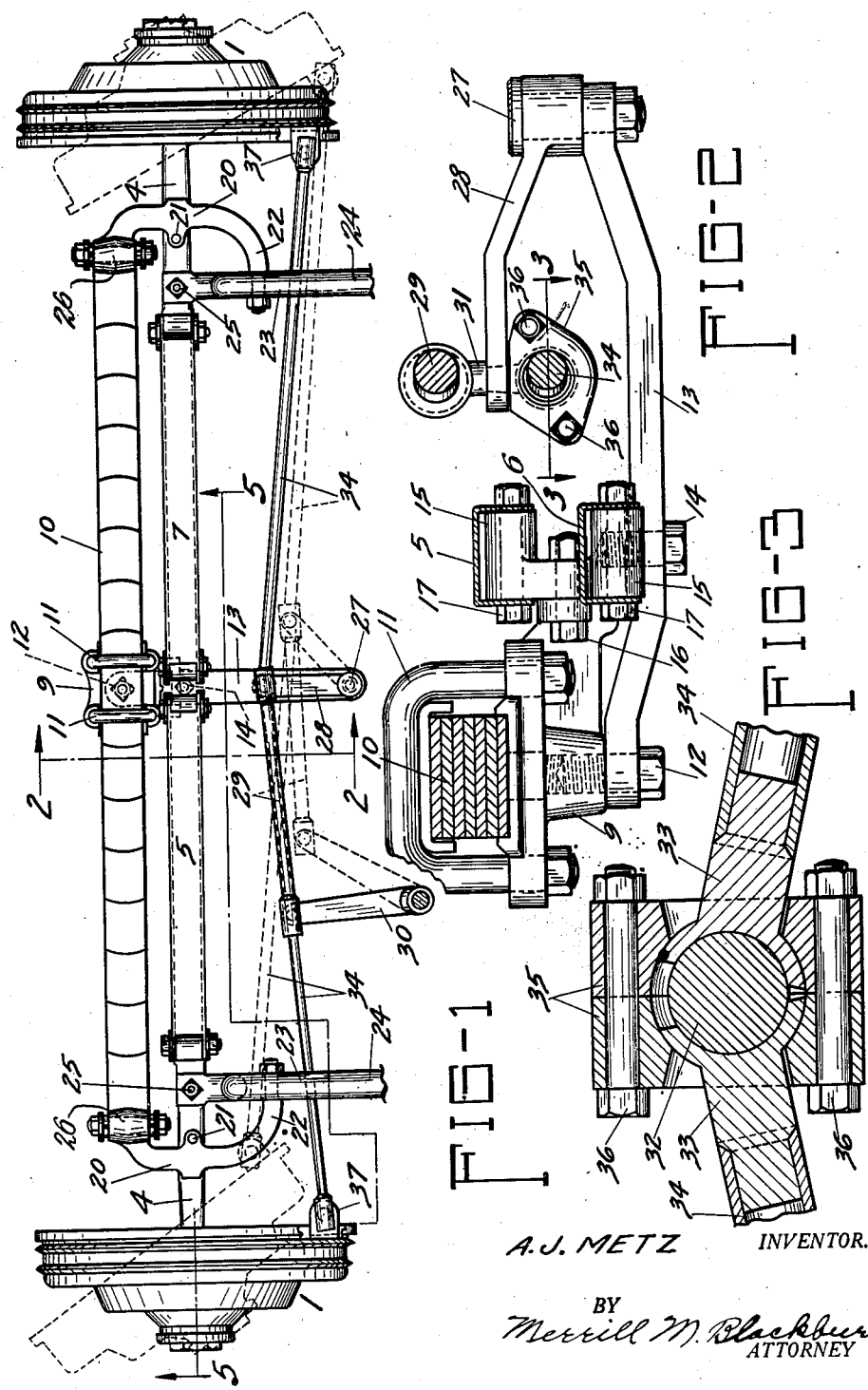
A. J. METZ  INVENTOR.
BY Merrill M. Blackburn
ATTORNEY

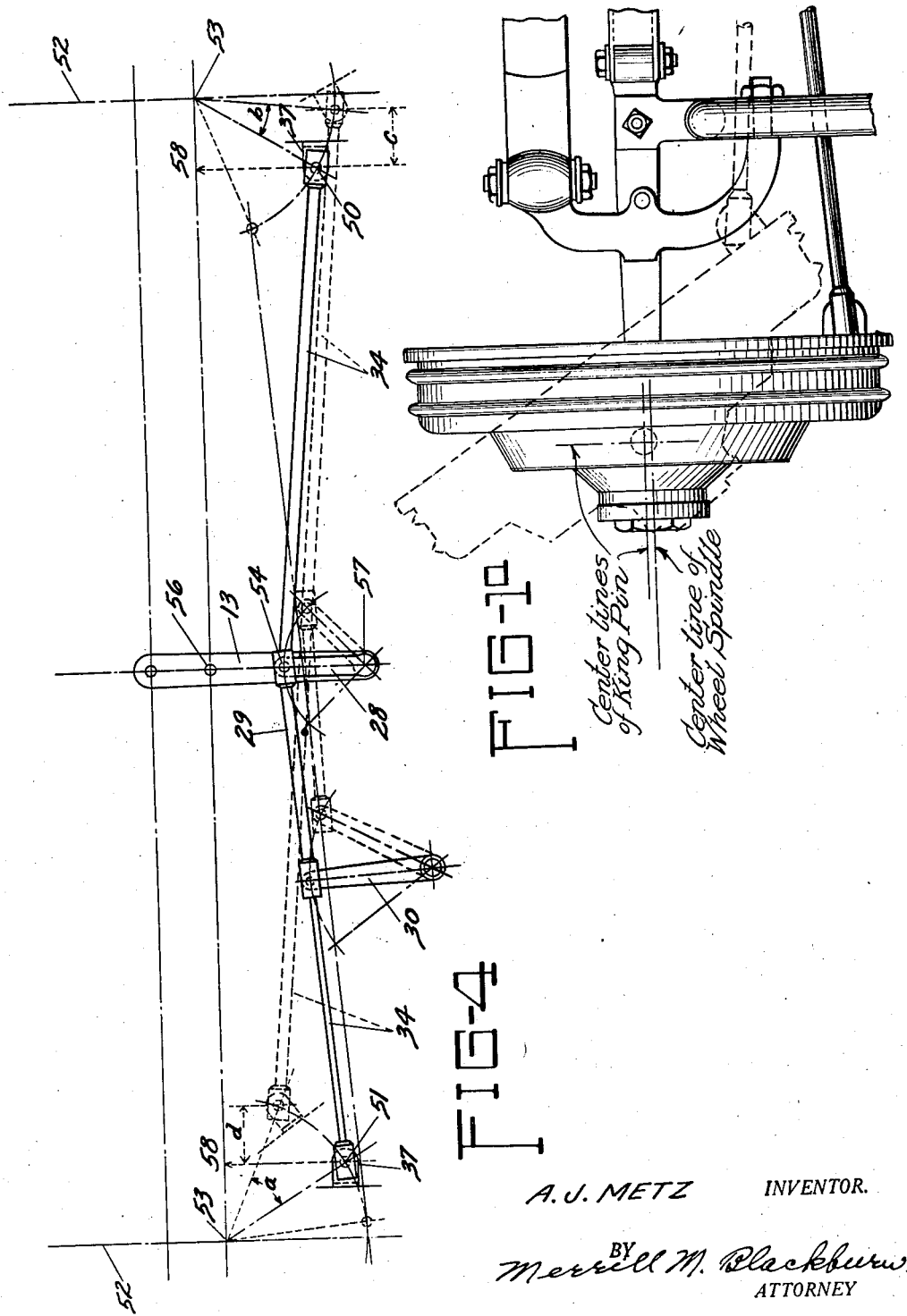

July 2, 1940.  A. J. METZ  2,206,101
FRONT END ASSEMBLY FOR MOTOR VEHICLES
Filed May 3, 1937  5 Sheets-Sheet 3
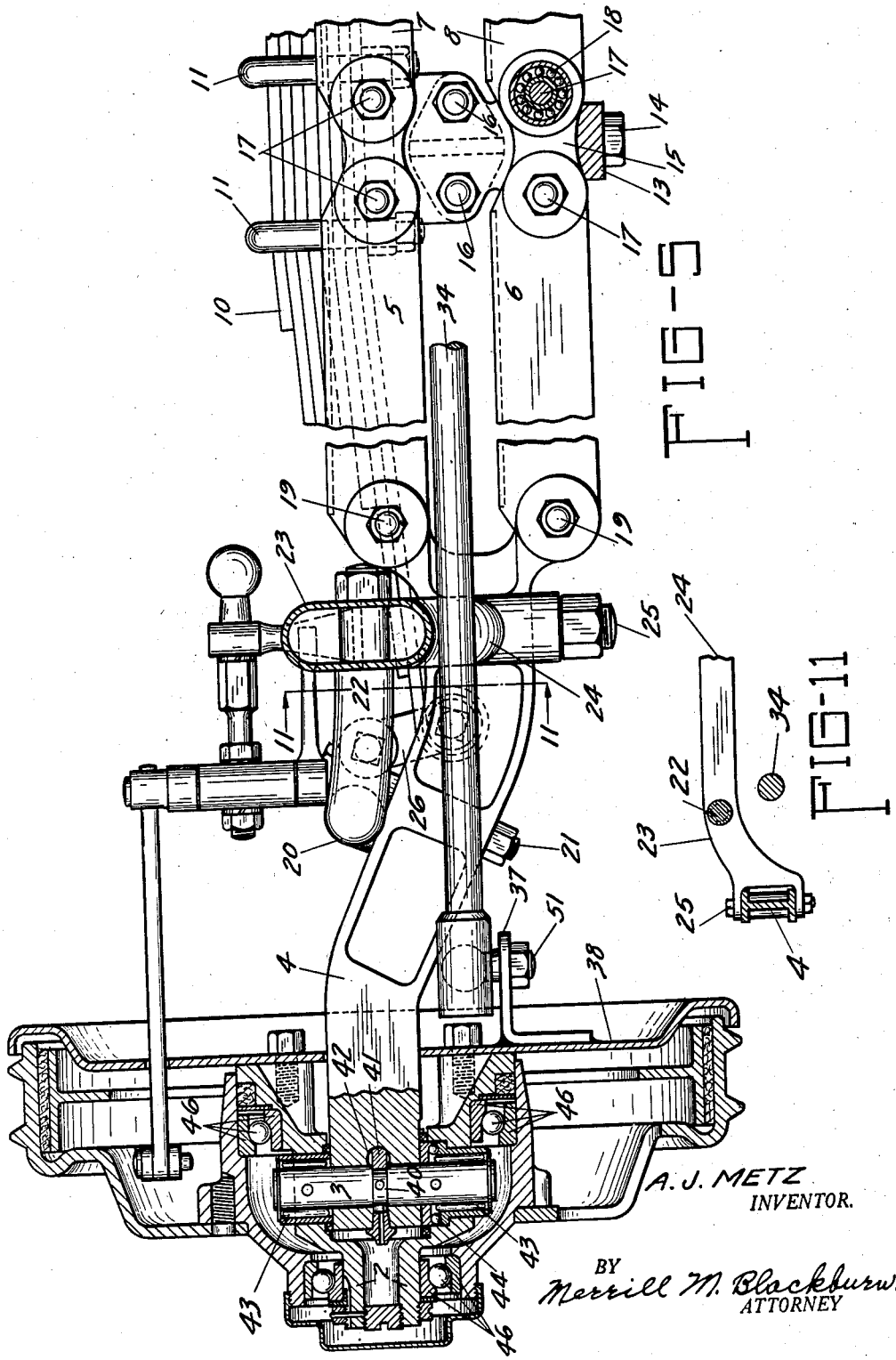
A. J. METZ
INVENTOR.
BY Merrill M. Blackburn.
ATTORNEY

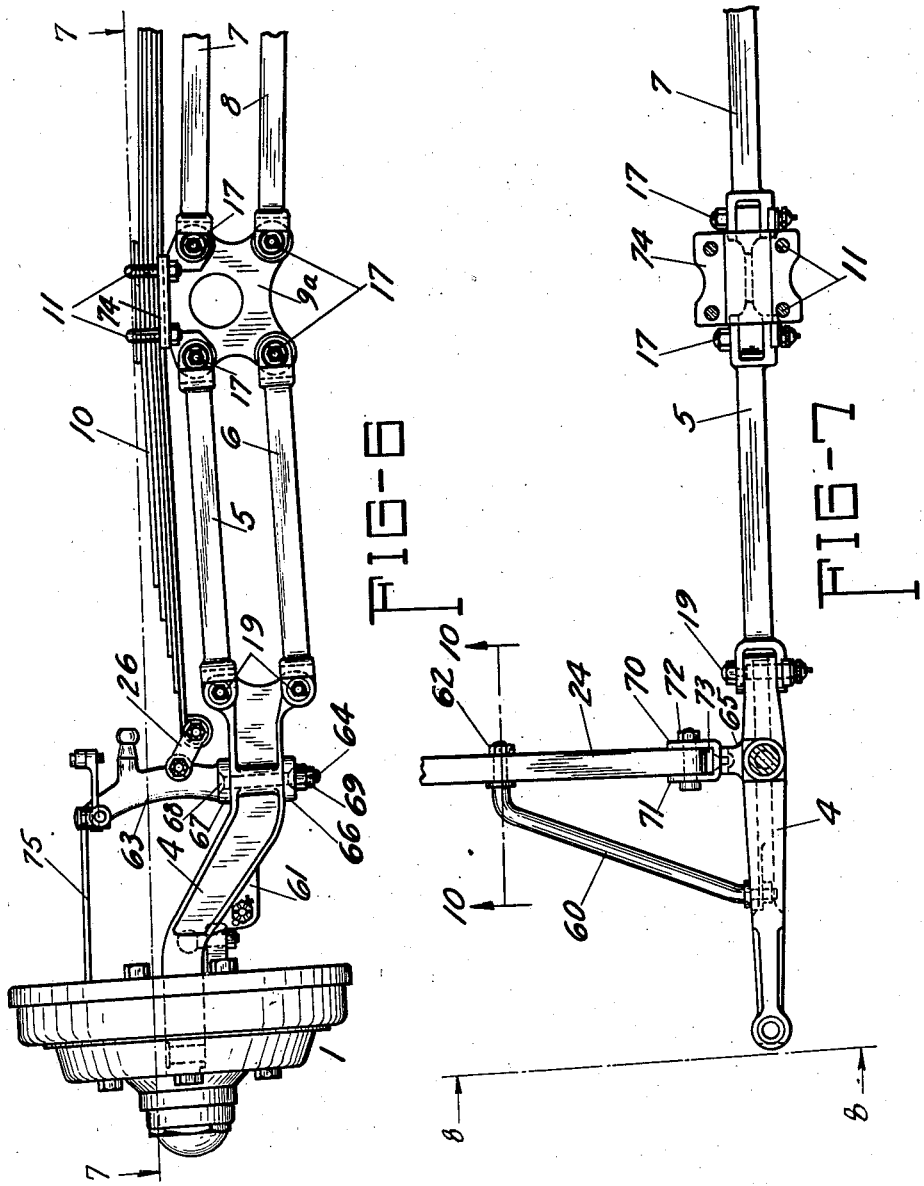

July 2, 1940. A. J. METZ 2,206,101
FRONT END ASSEMBLY FOR MOTOR VEHICLES
Filed May 3, 1937 5 Sheets-Sheet 5
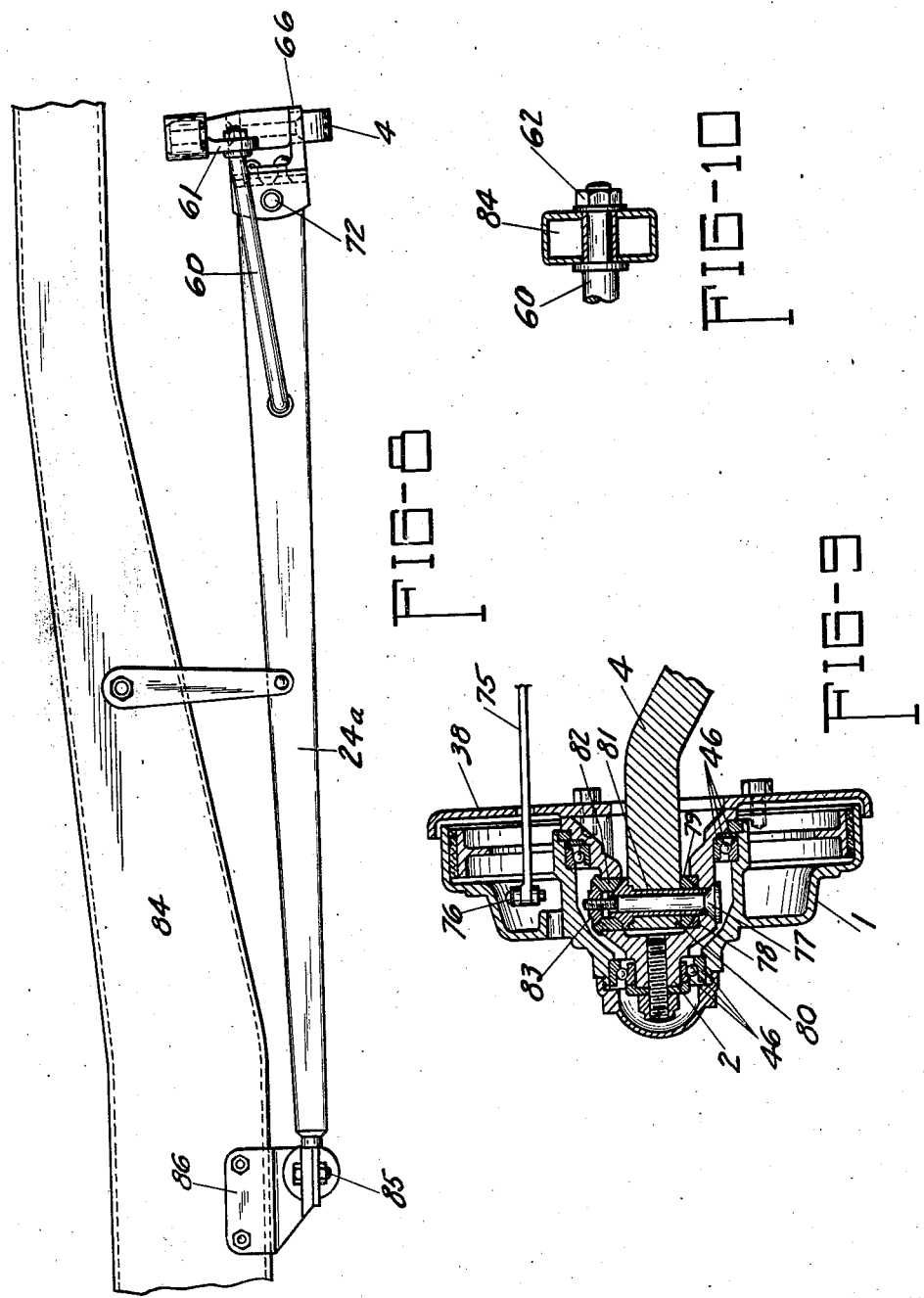
A. J. METZ INVENTOR.
BY Merrill M. Blackburn
ATTORNEY.

Patented July 2, 1940

2,206,101

UNITED STATES PATENT OFFICE 2,206,101

FRONT END ASSEMBLY FOR MOTOR VEHICLES

Anthony J. Metz, Davenport, Iowa

Application May 3, 1937, Serial No. 140,463

20 Claims. (Cl. 280—96.2)

The present invention relates to the front end assembly of a motor vehicle and more particularly to the suspension of the front end of the vehicle body, although it includes also the connection of the wheels to the spindles, the steering mechanism, and the combination of these various features.

As is well known by those skilled in the art, it is desirable so to construct the running gear of a motor vehicle that the vehicle tends to run straight ahead unless turned out of such a course by the application of physical force by the driver of the vehicle. It is also desirable so to support the body of the vehicle with relation to the running gear that the transmission of road shocks of various sorts from the running gear to the body of the vehicle will be eliminated to as great an extent as possible. Many attempts have been made to accomplish both of these desirable ends, but much improvement is still possible and it has therefore been my purpose to improve upon the many prior art devices to as great an extent as possible.

The main object of this invention is to improve the operation of motor vehicles, that is, to improve the riding and driving qualities thereof. In order to achieve this object, I have provided a new type of steering mechanism such that the vehicle wheels are kept at such an angle with relation to each other that the axial lines thereof intersect each other at a point lying in a vertical plane passing axially through the rear or fixed axle of the vehicle. Further, I have provided a novel connection between the wheels and the spindles thereof. Also, I have provided a novel suspension for the vehicle front end and, for the purpose stated, I have provided the combination of the foregoing elements.

Among the further objects of my invention are so to construct a motor vehicle running gear that the wheels, when left free to choose their own course, will automatically assume such a position that the vehicle will run straight ahead; so to construct a vehicle of the character indicated that it will be easily steered, notwithstanding its tendency automatically to assume a straight ahead running position; so to construct the running gear of a motor vehicle that it is practically impossible for road shocks to be transmitted from the running gear to the body of the vehicle; so to arrange the connection of the vehicle steering mechanism to the vehicle brakes that there will be no inadvertent and unintentional application of the brakes when making a turn; and such further objects, advantages, and capabilities as will hereafter appear and as are inherent in the construction disclosed herein. My invention further resides in the combination, construction, and arrangement of parts illustrated in the accompanying drawings and, while I have shown therein what is now considered the preferred embodiment of this invention, I desire the same to be understood as illustrative only and not to be interpreted in a limiting sense.

The present application is a continuation in part of my application, Serial No. 750,839, filed October 31, 1934, and consists, in part, of improvements upon the structures disclosed and claimed in my prior patents, No. 1,926,549 and No. 1,926,550, issued September 12, 1933, and partly in a new spring suspension for the body, commonly referred to in the art as independent springing, and partly in improvements in steering mechanism. As indicated above, there have been numerous attempts to render the vehicle body less subject to vibrations due to road shocks, but these have all been, for one reason or another, more or less unsuccessful. This invention, on the other hand, accomplishes the desired results to a remarkable extent.

In the drawings annexed hereto and forming a part hereof:

Fig. 1 represents a plan view of a front end assembly of a motor vehicle with the hubs and brake drums shown but with the spokes, rims, and tires omitted;

Fig. 1a is an enlarged plan view of the left hand portion of the front end assembly illustrated in Fig. 1, showing by legend that the center line of the king pin or vertical axis of the wheel lies a short distance ahead of the center line of the wheel spindle, thereby to provide caster;

Fig. 2 represents a fragmentary transverse section substantially along the plane indicated by the line 2—2, Fig. 1;

Fig. 3 represents a fragmentary horizontal section taken substantially along the plane indicated by the line 3—3, Fig. 2;

Fig. 4 represents, more or less diagrammatically, the steering mechanism and illustrates the geometry of the operation thereof;

Fig. 5 represents a fragmentary vertical section taken approximately along the plane indicated by the line 5—5, Fig. 1;

Fig. 6 illustrates a part of a front axle and spring and a front wheel hub, shown in elevation;

Fig. 7 represents a plan section substantially along the plane indicated by the line 7—7, Fig. 6, with the hub omitted;

Fig. 8 represents an end elevation at a right angle to Fig. 7, taken in the direction indicated by the arrows 8—8 in that figure;

Fig. 9 represents a central vertical section through the hub and the end of the axle, illustrating the structure of the hub and its connection with the axle;

Fig. 10 represents a cross-section, substantially along the plane indicated by the line 10—10, Fig. 7;

Fig. 11 represents a vertical section substantially along the plane indicated by the line 11—11, Fig. 5.

In prior constructions, attempts have been made to swing the wheels, when steering the vehicle, in such a manner that the wheels would travel about a common center of turning so as to avoid side slipping of the wheels when going around a corner. However, the efforts in this direction have been more or less unsuccessful for various reasons. I have provided a construction such that, when making a turn, the inside wheel will be turned farther than the outside wheel, the amount of turn being such that the axial lines of the two wheels projected will intersect one another substantially in a vertical plane passing longitudinally through the rear axle. From this it follows that the two wheels will be travelling about the same vertical line as a center of turning and there will be no side slippage of either wheel with relation to the other. In order to accomplish this, the wheel which is upon the inside of the turn must be made to turn through a greater angle, horizontally, than the corresponding wheel upon the opposite side of the vehicle. This action I accomplish by the particular mechanism which I use to connect the wheels and cause their turning.

Reference will now be made more particularly to Figs. 1, 2, and 3 for a detailed description of the steering mechanism whereby the wheels are turned to right or left for the steering of the vehicle. The wheels are represented in the present drawings by the brake drums and hubs 1, mounted on spindles 2 which are pivotally connected by means of the pins 3 to stub axles 4. The inner ends of these stub axles are forked, as shown in Fig. 5, and to the inner ends of these stub axles are connected channel shaped members 5, 6, 7, and 8 which form parts of parallelogram members connecting the stub axles to a central casting 9 forming one end of each of the parallelograms. The casting 9 is secured to the spring 10 by means of the U-bolts 11.

Secured to the under side of the casting 9, by means of a bolt 12, is a bracket arm 13 which is also secured, by means of a bolt 14, to a casting 15 which constitutes an extension of the casting 9 and is bolted thereto by means of bolts 16. Bolts 17 secure the inner ends of the channel members 5, 6, 7, and 8 to the casting 15 and thus to the spring 10. Suitable ball bearings 18 are interposed between the bolts 17 and the ends of members 5, 6, 7, and 8, thus insuring free and easy working of these joints during the operation of the vehicle. At their outer ends, the channel members 5, 6, 7, and 8 are connected to the stub axles by bolts 19 surrounded by ball bearings, as in the case of the inner ends. This insures free working of these parts during the relative up and down movement of the wheels and the body of the vehicle. While I have disclosed herein ball bearings 18, I may use roller bearings instead.

Brackets 20 are secured to the stub axles 4 by means of bolts 21 and each has an end turned inwardly, as at 22, the same being passed through the portion 23 of the radius rod 24. As shown in Fig. 1, the forward ends of the radius rods are secured to the stub axles at 25. Shackles 26 connect the ends of the spring 10 with the brackets 20, thus suspending the spring from the stub axles 4. Inasmuch as the body of the vehicle is connected to the spring 10 substantially midway of its length, the front end of the vehicle is, consequently, supported by means of the spring, the brackets, and the stub axles.

As indicated heretofore, the arm 13 is connected to and projects rearwardly from the castings 9 and 15. Because of its connections, it is mounted rigidly and does not swing laterally under stresses. Pivotally connected to the rear end of the arm 13, by means of a bolt 27, is an arm 28 which oscillates laterally under pressure by the drag link 29 connected to the crank arm 30 in turn connected to the steering post.

A post 31 passes through and is fairly rigidly supported by the crank arm 28. This post has a ball 32 at its lower end which cooperates with socket members 33 which are connected to the inner end of the tie-rod sections 34. The ball 32, together with the socketed ends of members 33, are held within a socket formed by the holding members 35. These members are held together by means of the bolts 36. They are so shaped as to permit relative movement of the members 33 and the holding member comprising the elements 35. This is shown most clearly in Figs. 1 and 3. The tie-rods 34 are connected to lugs 37 on the inside of the backing plates 38 of the brake drums thereby, in effect, providing spindle arms extending from the axes of pins 3 to the centers of the connections between the tie-rods and lugs 37. For the sake of clearness the brake mechanism is not illustrated in Fig. 1.

The structure of the wheel and the connection thereof to the axle will next be described. A hole is formed through the end of the stub axle 4, preferably perpendicularly to the axial line of the axle for the reception of the pin 3. The pin is formed, approximately centrally, with a groove 40 for the reception of a key 41 passing through an opening 42 in the outer portion of the stub axle, the purpose of this key being to hold the pin in proper position within the structure. The pin 3 has openings therethrough to permit the passage of lubricating fluid so that the roller bearings 43 and ball bearings 44 will be properly lubricated. On account of the steering mechanism layout, it is unnecessary for the wheels to have any camber. Therefore, the pins 3 are parallel to the central planes of the wheels and perpendicular to the axial line of the axle. Each wheel is provided with proper antifriction bearings 46, illustrated in the present instance as ball bearings. While caster may be omitted from this construction, it is deemed desirable to have a small amount thereof, but probably not in excess of one degree (1°).

In order to explain the operation of this device, it will now be necessary to refer to Fig. 4 of the drawings. In this figure, the parts are shown in the normal, straight ahead position by solid lines, and in the position for turning left, by the dotted lines. It is a well understood fact that in making a right or left hand turn the front wheels, that is, the wheels which are turned for turning the vehicle, must be so turned that they will always move about a common center, either a single point or a line connecting the centers of turning and lying in a vertical direction. This axis of turning is located in a vertical plane which includes the axis of the rear axle of the vehicle.

When the vehicle is steered to the right or left, the wheel on the inside of the turn must be turned about its pin 3 farther than the wheel at the opposite side of the vehicle, in order that the two wheels may travel about the same center or axis of rotation. This is illustrated in Fig. 4 in which the angle $a$ is greater than the angle $b$. By properly proportioning the length of parts 13, 28, and 34 and the distance from the pins 3 to the point of connection of the tie-rods 34 to the brackets, it will be possible to secure practically perfect positioning of the wheels with relation to each other, for different angles of turn. The distance $c$ which the pivot point 50 travels laterally because of the right wheel turning through an angle equal to the angle $b$ is substantially equal to the distance $d$ which the pivot point 51 travels laterally because of the left wheel turning through an angle equal to the angle $a$. However, the angle $a$ must be greater than the angle $b$ to produce a displacement $d$ equal to the displacement $c$, because of the difference in position of the two angles in the quadrant and the difference in the functions of the angles. As the angle of turn away from the straight ahead position is increased, the difference in the angles $a$ and $b$ increases until the pivot point 50 passes the straight ahead plane through the pin 3, denoted by the line 52. When the wheels are turned in the opposite direction toward a straight ahead position, then the opposite is true, and the difference between the angles $a$ and $b$ decreases until it disappears when the wheels reach the straight ahead position. Turning from this point on to cause steering to the right, the reverse is true and the angle $b$ increases more rapidly than the angle $a$, thus resulting in the right hand or inside wheel turning farther than the left hand wheel. In this way, the wheels are made to turn about a common center located in the vertical plane passing longitudinally through the rear axle.

From the foregoing it will be seen that by a proper proportioning of the parts of the apparatus, particularly those shown in Fig. 4, the front wheels of the vehicle will be caused to turn laterally at such rates that they will be kept travelling, at all times, about a common moving center lying along a projection of the axis of the rear wheels, when not traveling straight ahead. This does away with side slippage of the wheels when making a turn. Naturally, differences in specifications of vehicles will necessarily result in changes in dimensions of the parts shown in Fig. 4. A typical example of an operative layout is as follows:

| | |
|---|---|
| Distance from 50 to 58 | 6" |
| Distance from 51 to 58 | 6" |
| Distance from 51 to 52 | 3½" |
| Distance from 51 to 54 | 24½" |
| Distance from 54 to 57 | 4⅜" |
| Distance from 56 to 57 | 7¾" |
| Distance from 51 to 53 | 6¹³⁄₁₆" (approx.) |

Of course, if any one of these distances is changed materially, it will be necessary to calculate a complete new set of figures. The essential characteristic of the relationship of the parts is that, as the steering wheel is turned to turn the crank arm 28, the tie-rods 34 will turn the wheels to right or left to such an extent that, as they travel along the surface, they will move about a single point or a single line, substantially, as a turning axis. If there is no camber, this line is reduced to a point and the wheels travel about this point as a center. Thus, side slippage is reduced to zero, except to the extent that it may be the result of centrifugal force.

In the foregoing tabulation, the numeral 50 represents the axis of the pivotal connection between the right hand tie-rod 34 and the bracket 37; the numeral 51 corresponds to numeral 50 but on the left side of the vehicle; numeral 52 indicates the central vertical plane of the wheel when running straight ahead; 53 represents the axis of either pin 3; 54 represents the axis of post 31; 56 is the mid-point in the length of the axis of the axle; 57 is the axis of the pivotal connection 27; 58 represents points in the axis of the axle where planes, parallel with the plane 52, when the vehicle is set to run straight ahead and passing through points 50 and 51, will intersect said axis.

The structure shown in Figs. 6 to 10, inclusive, is that shown in my prior application, identified above. In this construction, a brace 60 passes through a fin 61 on the under side of axle section 4 and is tightly secured therein, as indicated in Figs. 6 and 7. The other end of brace 60 passes through the radius rod 24 and is secured in place by a nut 62. It is loosely secured therein so as to permit a certain amount of play between the radius rod and the brace. The perch 63 has a screw-threaded extension 64 at its lower end which passes through one of the clevis-like ends of the block 65 and through the axle section 4. The parts 66 and 67 of the block 65 are countersunk, the latter for the reception of the frusto-conical enlargement 68 and the former for the reception of the similarly shaped nut 69. This nut is castellated and the extension 64 perforated and a cotterkey is placed through the two to prevent rotation of the nut with relation to the extension, after the nut has been tightened up completely. This arrangement insures that there will be no relative lateral movement of these parts with relation to each other during use of the machine.

The second clevis end of the block 65, comprising the parts 70 and 71, is secured to the radius rod 24 by means of the nut and bolt 72. Between the end of the radius rod and the end of the slot between the parts 70 and 71 is secured a rubber cushion 73 which is placed under compression when the bolt 72 is inserted. The cushion is therefore held in place and is always under compression. If there is any relative rocking between the radius rod 24 and the block 65, the cushion 73 yields to permit same without placing undue strain upon the metallic parts.

The central unit 9a of the structure shown in Figs. 6 to 10 differs somewhat from the corresponding element 9, described above, but its function is substantially the same and its connection to the stub axle sections 4, by means of the elements 5, 6, 7, and 8, remains unchanged. In this construction, the spring shackles 26 connect the spring 10 to the perches 63. However, with an arrangement such as that shown in Fig. 6, it may be impractical to use as long a spring as with the construction shown in Fig. 5 and, furthermore, the shackles 26 are arranged more nearly parallel to the spring than in the structure shown in Fig. 5. This causes a lateral pull on the perches which results in a compressive force longitudinally of the members 5 and 7 and a longitudinal tensional pull on the members 6 and 8. This causes binding of the bearings at the ends of these members which is almost completely done away with in the structure shown in Fig. 5, resulting in more improved action. However, the basic principle remains the same. Placing the connection of spring 10 to the axle sections 4 farther out than shown in Figs. 6 and 7 improves very much the operation of the vehicle.

As in the case previously described, the manner of connecting the stub axles 4 to the plate 9a permits relative vertical movement between the hub and the plate 9a without changing the direction of the central plane of the wheel. The central connecting plate 9a has the supporting plate 74 formed integrally therewith, said plate 74, during use, normally extending approximately horizontally. To this is secured the spring 10 by means of the U-bolts 11, these bolts securing the spring 10 to the front body frame member, as will be understood by those skilled in the art.

The brake-rod 75 extends into the hub above the axle section 4, where, as shown in Fig. 9, its pivotal connection 76 with the brake actuating member is located approximately above the bolt 77. This brake-rod 75 is approximately perpendicular to the bolt 77. It is desirable to have the pivot 76 as nearly directly above the bolt 77 as it may conveniently be. This prevents binding of the brakes when the wheels are cramped in turning a corner. The hole through the end of the axle section 4, for the reception of the bolt 77, is formed at a right angle to the axis of the end portion of the axle but the hole in the hub for the reception of this bolt 77 is inclined inwardly at the top approximately one and one-half degrees (1½°). This results, when the axle, hub, and bolt are assembled, in throwing the top of the wheel out the amount that this hole is inclined. If the inclination of this hole is one and one-half degrees (1½°), then the wheel will be inclined outwardly at its top, resulting in a camber of one and one-half degrees (1½°).

A depression is formed in the bottom of the inner face of the spindle 2 and in this depression there is located a bearing member 78 which has a frusto-conical depression in its upper side for the reception of a correspondingly shaped face on the under side of the bearing block 79. This block has an upwardly projecting ear 80 at its outer end engaging in a notch at the end of the axle so as to prevent relative rotation between the axle and the block 79. This results in relative rotation of the elements 78 and 79 which therefore constitute bearing members between the spindle and axle. Through these members 78 and 79 and the axle section 4 passes a sleeve 81. This sleeve 81 surrounds the bolt 77, corresponding to bolt 3, and fits tightly in the hole in the end of the axle section 4. Therefore, when the wheel is turned in the act of steering the vehicle, the sleeve does not turn, being fixed with relation to the axle, and the bolt turns with the hub. The upper portion of the sleeve 81 is enlarged and provided with an external surface to be engaged by a similarly shaped internal surface of the sleeve 82 which surrounds but is spaced from the upper end of the bolt 77. In its upper end, this sleeve 82 has an internal frusto-conical surface similar to the one at its lower end and, within this end of the sleeve 82, is positioned a nut 83, the lower face of which is shaped to fit the upper internal surface of the sleeve. This nut 83 has screw-threaded connection with the upper end of the bolt 77 and is held in place thereon by means of a cotterpin which passes through the end of the bolt. This bolt is located outwardly, slightly, from the plane parallel to the two ball bearings for the hub and midway between them. In other words, if a plane were passed midway between the ball bearings, this plane would not pass centrally through the bolt but would be located slightly inside of same, the off-setting of the two being preferably between one-eighth and one-fourth of an inch, with the top of the bolt closer to the plane than the bottom. It does not seem necessary to discuss these features of the present invention which are common to it and to the structure disclosed in my two patents identified above. For example, the axis of the axle is slightly below the axis of the spindle and the axis of the bolt is slightly forwardly of the axis of the spindle. This matter has been completely covered in the before mentioned patents and needs no further discussion here.

It may be seen from the foregoing that the parts 78, 79, and 82 and the conical end of the sleeve 81 constitute pivot bearings to support and guide the wheel at all times, while stationary or while oscillating in the act of steering.

The side frame member 84 of the vehicle has a bracket 86 secured thereto, as shown in Fig. 8, and this bracket has a substantially spherical socket in which is received the ball on the end 24a of the radius rod 24. Between the ball and socket is a partially resilient cushion of rubber which is placed under compression when the ball and socket are assembled and the nuts tightened up on the bolts 85. This construction makes possible relative movement between the axle and the frame without distorting strains. It also reduces wear and eliminates rattle.

A vehicle equipped with either of the above described constructions tends, when its wheels are turned out of normal straight ahead position, to return very quickly to such position, when released from the turning pressure. However, it takes very little pressure to turn the wheels when it is desired to steer the vehicle. Also, when one of the vehicle wheels strikes an obstruction or goes into a rut, and the vehicle is equipped with the spring and axle arrangement shown, the amount of movement of the vehicle body, in a vertical direction, is very slight, such movement being absorbed by the spring without being transmitted to the body.

It will of course be understood that the specific description of structure set forth above may be departed from without departing from the spirit of my invention as set forth in this specification and the appended claims.

Having now described my invention, I claim:

1. In a motor vehicle front end assembly, means connecting the front wheels of the vehicle and adapted to be secured by a portion centrally between the wheels to a vehicle body, a bracket rigidly connected to said means at the said center portion thereof and projecting a substantial distance rearward therefrom, a crank arm pivotally connected by one end to a rearward portion of said bracket and having its other end projecting forward thereof and capable of swinging laterally with relation to its rear end, dirigible wheels carried by said means on pivots for lateral turning and being provided with means in effect providing spindle arms for connection with tie-rods, tie-rods connected to said spindle arm means and the forward end of said crank arm and lying wholly rearward of the line of wheel pivots, and operating means for swinging said crank arm and thereby oscillating said wheels to turn the vehicle.

2. In a motor vehicle front end assembly, a transversely extending wheel carrier mechanism adapted to be rigidly secured at its center portion to the vehicle body and including members movable relative to said center portion, dirigible wheels carried by said members for movements up and down relative to said center portion, a bracket rigidly connected to said center portion and projecting a substantial distance rearward therefrom, a crank arm pivotally connected by one end to a rearward portion of said bracket and having its other end projecting forward thereof and capable of swinging laterally with relation to its rear end, said dirigible wheels being pivoted for lateral turning and being provided with means in effect providing spindle arms for connection with tie-rods, tie-rods connected to said spindle arm means and the forward end of said crank arm at places lying rearward of the line of wheel pivots, and operating means for swinging said crank arm and thereby oscillating said wheels to turn the vehicle.

3. A structure as defined by claim 1 in which, during normal, straight ahead driving, the connection of the tie-rods to the crank arm is nearer to the line of lateral turning pivots than are the connections of the tie-rods to the spindle arm means.

4. A structure as defined by claim 1 in which the means connecting the wheels comprises, in part, parallelograms allowing relative motion of the vehicle wheels and body in a vertical direction and yet maintaining a definite position of angularity of the wheels with relation to a vertical plane.

5. In a steering mechanism for a motor vehicle, a pair of dirigible wheels, a support for relatively rigid attachment to the supporting means for the vehicle front end, said support projecting rearwardly substantially midway between the vehicle wheels, a crank pivotally connected to said support at a place rearwardly of the attachment of the support to the vehicle supporting means, means connected to said crank to turn the same about its pivot, and tie-rods connected to said crank and to said wheels and actuated by said crank to cause turning of the vehicle wheels when the wheel-turning means is actuated, the connection of the tie-rods to the crank, when the wheels are positioned to run straight ahead, being located between the transverse axis of the front end supporting means of the vehicle and a straight line connecting the centers of connection of the tie-rods to the vehicle wheels.

6. In a steering mechanism for a motor vehicle, a pair of dirigible wheels, a support for relatively rigid attachment to the supporting means for the vehicle front end, said support projecting rearwardly substantially midway between the vehicle wheels, a crank pivotally connected to said support at a place rearwardly of the attachment of the support to the vehicle supporting means, means connected to said crank to turn the same about its pivot, and tie-rods connected to said crank and to said wheels and actuated by said crank to cause turning of the vehicle wheels when the wheel-turning means is actuated, the connection of the tie-rods to the crank, when the wheels are positioned to run straight ahead, being located between the transverse axis of the front end supporting means of the vehicle and a straight line connecting the centers of connection of the tie-rods to the vehicle wheels and a substantial distance ahead of the pivot connection between said crank and said support.

7. In a structure of the character described, a pair of dirigible wheels, a king pin mounting for each of said wheels, a bracket adapted to be connected to a motor vehicle front end assembly to be rigidly held thereby against movements relative to the vehicle body, a crank pivotally connected to said bracket, tie-rods connected to the said wheels to cause steering of the vehicle, and means pivotally connecting the tie-rods to the crank, said tie-rods being normally disposed in a substantially horizontal plane, the place of pivotal connection of the tie-rods to the crank being intermediate the ends of the bracket, a straight line joining the points of connection of the tie-rods to the wheels, when the latter are set to run straight ahead, passing between the ends of the crank, the tie-rods lying wholly rearward of a line of centers of said king pin mountings.

8. In a vehicle front end assembly, a pair of dirigible wheels disposed in substantially spaced parallel vertical planes when in a position to run straight ahead, wheel carrier means extending transversely between the wheels and carrying said wheels for movements toward and from the vehicle, said carrier means including substantially vertical pivots for lateral turning movements of the wheels, a portion of said carrier means which is substantially midway between said wheels being adapted to be secured against vertical movements relative to the vehicle, a support relatively rigidly secured with respect to said midportion of said carrier means and disposed rearward of the said carrier means, tie-rods normally extending in substantially horizontal planes and connected with said wheels on pivots disposed rearward of the line of wheel centers, means pivotally associated with said support on an axis disposed rearward of said line of centers of the wheels, and means pivotally connecting said tie-rods with said pivotally associated means on axes between the pivots axis of said pivotally associated means and the line of centers of said wheels and forwardly of the line of centers of the tie-rod pivot connections to the wheels.

9. In a vehicle front end assembly, a pair of dirigible wheels disposed in substantially spaced parallel vertical planes when in a position to run straight ahead, wheel carrier means including a spring extending transversely between the wheels and carrying said wheels for movements toward and from the vehicle, said carrier means including substantially vertical pivots for lateral turning movements of the wheels, a portion of said carrier means which is substantially midway between said wheels being adapted to be secured against vertical movements relative to the vehicle, a support relatively rigidly secured with respect to said midportion of said carrier means and disposed in a direction rearward of the line of wheel centers, tie-rods normally extending in substantially horizontal planes and connected with said wheels on pivots disposed rearward of the line of wheel centers, means pivotally associated with said support on an axis disposed rearward of said line of centers of the wheels, and means pivotally connecting said tie-rods with said pivotally associated means on axes between the pivot axis of said pivotally associated means and the line of centers of said wheels and forwardly of the line of centers of the tie-rod pivot connections to the wheels.

10. In a suspension of the pivoted quadrilateral type, a transverse spring supporting the weight of an end of the vehicle body, a pantograph parallelogram structure comprising articulated members, means connected with said structure for attachment of vehicle wheels thereto, means having pivotal connection to the wheels by virtue of which the wheels may be swung in a substantially horizontal direction, the axes of the pivotal connections being substantially vertical and located substantially in the vertical central planes of the wheels, and means connecting the ends of the springs to the first named means intermediate the ends of the latter.

11. An independent wheel mounting comprising floating members constituting a parallelogram structure, said structure having stub axles extending laterally therefrom, a transverse spring centrally connected to said structure, and a connection between the end portions of said spring and said stub axles beyond the ends of said parallelogram structure.

12. In a suspension of the character described, a parallelogram structure comprising a body, stub axles, and parallel bars connecting the body with the stub axles, in combination with a spring connected to said body and having its ends connected with said stub axles beyond the outer ends of the parallel bars and between the ends of the stub axles.

13. A structure as described by claim 12 in which spring perches are mounted upon the axles and have the spring ends connected thereto.

14. A suspension of the character indicated comprising, in combination, a spring for supporting a vehicle body, a pair of wheels, a connecting body centrally connected to said spring, axle sections connected to the vehicle wheels, the ends of the spring being connected to said axle sections to be supported thereby, and substantially parallel connecting members connecting said body to said axle sections, the connections of the spring to the axle sections being located between and spaced from the wheels and the adjacent ends of said connecting members.

15. An independent wheel mounting comprising floating members constituting a transversely extending parallelogram structure, a transverse spring connected to said structure, axle sections projecting transversely of the vehicle from said structure and having the wheels mounted thereon, a connection between the middle portions of said axle sections and said spring, a radius rod connected to each axle section and extending substantially at right angles to the major axis of the section, and a brace connected to each radius rod rearwardly of the axle sections and to the axle sections laterally from the radius rods, whereby to render the structure rigid in a longitudinal direction, whereby to prevent horizontal movements of the axle sections relative to the vehicle.

16. In a vehicle front end assembly, a pair of wheels disposed in substantially spaced parallel vertical planes, a stub axle for each wheel, means mounting each of said wheels upon one of said stub axles for pivotal movements about an axis substantially vertical to a horizontal plane containing the line of centers of said wheels, said vertical axis of each wheel being disposed parallel and adjacent to the central plane of rotation of such wheel, each of said wheels being so mounted as to have an amount of caster within a range of zero and substantially one degree, a support disposed substantially centrally between said wheels for supporting a vehicle body, a pair of parallel arms of substantially equal length for connecting said support with each one of said stub axles, each pair of said parallel arms having pivotal connections with said axles and said support for vertical movements in substantially one vertical plane, tie rods connected with said wheels on pivots disposed rearwardly of said line of wheel centers, means pivotally associated with said support on an axis disposed rearwardly of said line of centers of said wheels, and means pivotally connecting said tie rods with said pivotally associated means on axes between the axis of said pivotally associated means and the line of centers of said wheels and forwardly of the line of centers of the tie rod pivot connections to the wheels.

17. In a vehicle front end assembly, a pair of wheels disposed in substantially spaced parallel vertical planes when running straight ahead, means mounting each of said wheels for rotation and for pivotal movements about an axis substantially vertical to a horizontal plane containing the line of centers of said wheels, said vertical axis of each wheel being disposed parallel and adjacent to the central plane of rotation of such wheel, each of said vertical axes being disposed forwardly of said line of centers, a frame, means connecting said frame and each mounting means, a longitudinally extending radius rod connected between each mounting means and said frame, said radius rod extending rearwardly substantially perpendicular to the line of axes of the wheels when the wheels are running straight ahead, tie rods connecting said wheels to effect simultaneous turning thereof about their vertical axes, means pivotally connecting said tie rods substantially at the central vertical longitudinal plane of the vehicle, and means for guiding said tie rod connecting means, the parts being proportioned and arranged so as to cause the wheel on the inside of the turn, when turning the vehicle, to swing about its vertical pivot axis at a faster rate than the rate of the corresponding movement of the other wheel, the rates being so related as to maintain a common center of turning for said wheels.

18. In a vehicle front end assembly, a pair of wheels disposed in substantially spaced parallel vertical planes when running straight ahead, a stub axle for each wheel, means mounting each of said wheels upon one of said stub axles for pivotal movements about an axis substantially vertical to a horizontal plane containing the line of centers of said wheels, said vertical axis of each wheel being disposed parallel and adjacent to the central plane of rotation of such wheel, each of said wheels being so mounted as to have an amount of caster within a range of zero and substantially one degree, a support disposed substantially midway between said wheels for supporting the vehicle, means including a vertically movable parallelogram structure secured to said support and to said stub axles for relative vertical movements between said support and stub axles, a crank pivotally connected with said support rearwardly of said line of centers of said wheels, tie rods pivotally connected with said crank and with said wheels, the connections of said tie rods with said crank being located forwardly of a line of centers of connection between the tie rods and wheels and behind said line of centers of said wheels, and means for moving said crank to steer said wheels.

19. In a vehicle front end assembly, a pair of wheels disposed in substantially spaced parallel vertical planes when running straight ahead, means mounting each of said wheels for swinging movements about an axis substantially vertical to a horizontal plane containing the line of centers of said wheels, said vertical axis of each wheel being disposed parallel and adjacent to the central plane of rotation of such wheel, each of said wheels being so mounted as to have an amount of caster within a range of zero and substantially one degree, a support disposed substantially midway between the said wheels for supporting the vehicle body, means including vertically movable parallelogram structures secured to said support and to said mounting means for relative vertical movements between said support and mounting means, a crank pivotally associated with said support rearwardly of said line of centers of said wheels, tie-rods pivotally connected with said crank and with said wheels, the connections of said tie-rods with said crank being located forwardly of a line of centers of connection between the tie-rods and wheels and behind said line of centers of said wheels, and means for moving said crank to steer said wheels.

20. In a motor vehicle front end assembly, means adapted to connect the front wheels of a vehicle and adapted to be secured by portion thereof centrally between the wheels to the vehicle body, a crank arm, said arm having a portion pivotally secured relative to said connecting means and the vehicle body at a place substantially midway between the vehicle sides and rearwardly of a line of centers of the vehicle wheels, said crank arm having a portion extending forward toward said line of centers and adapted to swing laterally with relation to its pivotally secured portion, dirigible wheel members carried by said connecting means on pivots for lateral turning and being provided with means in effect providing spindle arms for connection with tie-rods, tie-rods connected to said spindle arm means and connected with the forward end of said crank arm at a place forward of a line of centers of connection between the tie-rods and spindle arm means, said tie-rods lying wholly rearward of the line of wheel pivots, and operating means for swinging said crank arm and thereby oscillating said wheels to turn the vehicle.

ANTHONY J. METZ.